(12) United States Patent
Li (10) Patent No.: US 7,789,020 B2
(45) Date of Patent: Sep. 7, 2010

(54) ROAD AND RAIL VEHICLE AND TRACK THEREFOR

(75) Inventor: Xiaolong Li, Hefei (CN)

(73) Assignee: Hefei Bopu High-Tech Co., Ltd., Hefei (CN)

( * ) Notice: Subject to any disclaimer, the term of this patent is extended or adjusted under 35 U.S.C. 154(b) by 0 days.

(21) Appl. No.: 12/212,769

(22) Filed: Sep. 18, 2008

(65) Prior Publication Data

US 2009/0050011 A1    Feb. 26, 2009

Related U.S. Application Data

(63) Continuation-in-part of application No. PCT/CN2007/000639, filed on Feb. 28, 2007.

(30) Foreign Application Priority Data

| Mar. 18, 2006 | (CN) | .................. 2006 1 0067588 |
| Apr. 9, 2006 | (CN) | .................. 2006 1 0074440 |
| Jan. 17, 2007 | (CN) | .................. 2007 1 0007685 |

(51) Int. Cl.
*E01B 25/00* (2006.01)

(52) U.S. Cl. .................. 104/130.01; 105/72.2

(58) Field of Classification Search .............. 105/72.2, 105/215.1, 215.2; 104/30, 31, 32, 32.1, 35, 104/48, 262, 273; 180/167, 168, 169
See application file for complete search history.

(56) References Cited

U.S. PATENT DOCUMENTS

| 4,566,391 A * | 1/1986 | Haberl et al. ............. 105/215.1 |
| 4,708,066 A * | 11/1987 | Heckman ................ 105/215.2 |
| 5,289,778 A * | 3/1994 | Romine .................... 104/88.04 |
| 5,369,591 A * | 11/1994 | Broxmeyer ................. 701/301 |
| 5,390,118 A * | 2/1995 | Margolis et al. ............ 701/23 |
| 6,012,396 A * | 1/2000 | Schulz ..................... 105/72.2 |
| 6,050,359 A * | 4/2000 | Mouri et al. ............... 180/415 |
| 6,123,029 A * | 9/2000 | Mobley .................... 105/4.1 |
| 6,352,035 B1 * | 3/2002 | Kashiwase et al. ......... 105/72.2 |
| 6,976,432 B2 * | 12/2005 | Jacob ...................... 105/72.2 |
| 7,077,065 B2 * | 7/2006 | Tremblay et al. .......... 105/72.2 |
| 7,082,879 B2 * | 8/2006 | Alt ........................ 104/88.01 |
| 2001/0050026 A1 * | 12/2001 | Esposito et al. .......... 105/215.2 |
| 2002/0162727 A1 * | 11/2002 | Matsuo .................... 198/412 |
| 2002/0165648 A1 * | 11/2002 | Zeitler .................... 701/23 |
| 2004/0094062 A1 * | 5/2004 | Jackson et al. ............ 105/72.2 |

(Continued)

FOREIGN PATENT DOCUMENTS

| EP | 1652698 A1 * | 5/2006 |
| WO | WO 2005014313 A1 * | 2/2005 |

*Primary Examiner*—S. Joseph Morano
*Assistant Examiner*—Jason C Smith
(74) *Attorney, Agent, or Firm*—Matthias Scholl P.C.; Matthias Scholl (57) ABSTRACT

A track of a road and rail vehicle, comprising: a railway track, and a routing device having a supporting plate and a turnout; wherein the routing device is disposed in front of the railway track and connected to a road; the supporting plate is aligned with the road and capable of moving horizontally and adjusting a direction or an angle of the road and rail vehicle entering the railway track; and the turnout enables the road and rail vehicle to switch between the road and the rail. A road and rail vehicle is also provided.

3 Claims, 9 Drawing Sheets

U.S. PATENT DOCUMENTS

| | | | |
|---|---|---|---|
| 2004/0250724 A1* | 12/2004 | Sobolewski | 105/215.1 |
| 2005/0204949 A1* | 9/2005 | Jacob | 105/72.2 |
| 2006/0027136 A1* | 2/2006 | Hunzinger | 105/72.2 |
| 2007/0089637 A1* | 4/2007 | Sproat | 105/72.2 |
| 2007/0119333 A1* | 5/2007 | Dupont et al. | 105/72.2 |
| 2007/0289477 A1* | 12/2007 | Sobolewski | 105/215.2 |
| 2009/0050011 A1* | 2/2009 | Li | 104/130.01 |

* cited by examiner

ROAD AND RAIL VEHICLE AND TRACK THEREFOR

CROSS-REFERENCE TO RELATED APPLICATIONS

This application is a continuation-in-part of International Patent Application No. PCT/CN2007/000639, with an international filing date of Feb. 28, 2007, designating the United States, now pending, which is based on Chinese Patent Application Number 200610067588.8 filed Mar. 18, 2006, and further claims priority benefits to Chinese Patent Application Numbers 200610074440.7 filed Apr. 9, 2006 and 200710007685.2 file on Jan. 17, 2007. The contents of all of the aforementioned specifications are incorporated herein by reference.

BACKGROUND OF THE INVENTION

1. Field of the Invention

The invention relates to a vehicle and a track therefor, and more particularly to a road and rail vehicle and track therefor.

2. Description of the Related Art

Fuel-powered and electric vehicles capable of traveling on a road surface are known. Vehicles, such as trains or subways, which travel on rails, are also known.

Attempts have been made to provide vehicles which are capable of traveling both on road surfaces and on rails. However, tandem road and rail vehicles have had only limited success and are much less common than separate road vehicles and rail vehicles.

Part of the problem with building tandem road and rail system lies in the difficulty of transiting between road and rail, and vice versa. In addition, tandem road and rail system are prone to derailments and suffer from high wind resistance, and traffic control difficulties. Even so, much opportunity exists in this area of transportation.

SUMMARY OF THE INVENTION

In view of the above-described problems, it is one objective of the invention to provide a road and rail vehicle to address the problems mentioned above.

It is another objective of the invention to provide a track of a road and rail vehicle to address the problems mentioned above.

To achieve the above objectives, in accordance with one embodiment of the invention, provided is a track of a road and rail vehicle, comprising: a railway track, a routing device having a supporting plate and a turnout; wherein the routing device is disposed in front of the railway track and connected to a road; the supporting plate is aligned with the road and capable of moving horizontally and adjusting a direction or an angle of the road and rail vehicle entering the railway track; and the turnout enables the road and rail vehicle to switch between the road and the rail.

In certain embodiments of the present invention, the railway track is fixed in a groove on a metal plate on the road.

In certain embodiments of the present invention, a transition portion elevating gradually is disposed on a rail surface of a front end of the railway track; and the rail surface is in a shape of a wedge or cusp.

In certain embodiments of the present invention, a transition portion elevating gradually is disposed on a rail surface of a front end of the railway track; and a distance between front ends of the railway tracks gradually decreases or increases.

In certain embodiments of the present invention, a rail surface of a cross section of the railway track is arc-shaped.

In certain embodiments of the present invention, the routing device further comprises a pair of distance-measuring devices disposed on both sides of the supporting plate; and a pair of electronic devices or hydraulic devices disposed on both sides of the supporting plate.

In certain embodiments of the present invention, the supporting plate measures a position of the road and rail vehicle with respect to the supporting plate; and controls the electronic device or the hydraulic device to horizontally move the supporting plate, so as to align the road and rail vehicle with the railway track.

In certain embodiments of the present invention, a guide station is disposed in the routing device; a pair of guide plates or guide bars are disposed on both sides of the guide station; the guide plates bend inwards; the guide bar is semicircular; and a pressure sensor is disposed between the guide plate and the guide station for controlling the electronic device or the hydraulic device to horizontally move the supporting plate.

In certain embodiments of the present invention, a pair of side beams are disposed on both sides of the routing device; a guide plate or a guide bar is disposed on an inner side of the side beam; the guide plate bends outwards; the guide bar is semicircular; and a pressure sensor is disposed between the guide plate and the side beam for controlling the electronic device or the hydraulic device to horizontally move the supporting plate.

In certain embodiments of the present invention, a gap is disposed at a junction between a straight rail and a turnout rail on the turnout and between a straight transition rail and a turnout transition rail; another straight rail is disposed in the front of an upper turnout transition rail on the turnout; and the road is laid on the turnout.

In accordance with another embodiment of the invention, provided is a road and rail vehicle, comprising a plurality of rail wheels; a plurality of tires; a rotating shaft; and a rail wheel carrier; wherein the rotating shaft is disposed between the tires; the rail wheels are disposed on the rotating shaft; and the rail wheels and the tires are disposed below the road and rail vehicle via the rail wheel carrier.

In certain embodiments of the present invention, the rail wheel carrier is flexibly disposed below the road and rail vehicle via the rotating shaft and a slave.

In certain embodiments of the present invention, the vehicle further comprises a tire carrier disposed below the road and rail vehicle via the rotating shaft and a sleeve, and connected to the rail wheel carrier via a steering linkage so that they are capable of rotating synchronously in a horizontal direction.

In accordance with further embodiment of the invention, provided is a road and rail vehicle, comprising a plurality of rail wheels, a plurality of tires each having a steel ring on one side, a rotating shaft disk and a guide flange; wherein the rotating shaft is disposed between the tires; the rail wheel is disposed on the side of the steel ring via the rotating shaft disk; and the guide flange is disposed on the side of the steel ring.

In accordance with still another embodiment of the invention, provided is a road and rail vehicle, comprising a plurality of rail wheels, a plurality of tires, a rotating shaft, a rotating shaft disk and a pair of guide flanges; wherein the rotating shaft is disposed between the tires; the rail wheel is disposed on the rotating shaft via the rotating shaft disk; and the guide flanges are disposed on both sides of the rail wheel disposed on the rotating shaft via the rotating shaft disk.

In certain embodiments of the present invention, treads of the rail wheels are arc-shaped.

In accordance with still further embodiment of the invention, provided is a transportation system comprising: a vehicle comprising a pair of rail wheels, a pair of tires, a sensor and a steering device; and a track of a road and rail vehicle, comprising a railway track, a road having a guide marker; wherein the rail wheel travels on the railway track; the tire is aligned with and travels on the road; the sensor measures magnetic signals generated by a guide marker, so as to determine a transverse position of the vehicle on the road; and the steering device comprises a steering control device capable of adjusting the tire and the rail wheel according to results generated by the sensor.

In accordance with still further embodiment of the invention, provided is a transportation system comprising: a vehicle comprising a pair of rail wheels, a pair of tires, a sensor and a steering device; and a track of a road and rail vehicle, comprising a railway track and a road having a guide marker; wherein the rail wheel travels on the railway track; the tire is aligned with and travels on the road; the sensor measures magnetic signals generated by a guide marker, so as to determine a transverse position of the vehicle on the road; and the steering device comprises a steering control device capable of adjusting the tire and the rail wheel according to results generated by the sensor.

In accordance with still further embodiment of the invention, provided is a transportation system comprising a vehicle comprising a pair of rail wheels, a pair of tires, a camera and a steering device; and a track of a road and rail vehicle, comprising a railway track and a road having a guide line; wherein the rail wheel travels on the railway track; the tire is aligned with and travels on the road; the camera monitors the guide line, so as to determine a transverse position of the vehicle on the road; and the steering device comprises a steering control device capable of adjusting the tire and the rail wheel according to results generated by the camera.

Advantages of the invention are:
1. Running resistance is greatly reduced, and power consumption and pollution discharge are decreased by 50-70%;
2. Convenient switching between the road and the railway saves time and money;
3. Use of tires greatly improves pulling force of the vehicle;
4. Good performance in starting, speeding, climbing and braking;
5. Reduced noise makes the vehicle environmentally friendly.

BRIEF DESCRIPTION OF THE DRAWINGS

Detailed description will be given below with reference to accompanying drawings, in which

FIG. 1-1 illustrates a tire disposed in a rail wheel carrier according to one embodiment of the invention;

FIG. 1-2 is a side view of the tire disposed in a rail wheel carrier shown in FIG. 1-1;

FIG. 2-1 illustrates a fixed rail wheel carrier disposed below a road and rail vehicle according to one embodiment of the invention;

FIG. 2-2 is a side view of a fixed rail wheel carrier with a hydraulic device according to one embodiment of the invention;

FIG. 2-3 is a schematic view of a lifting rail wheel carrier with a hydraulic device according to one embodiment of the invention;

FIG. 2-4 is a side view of the lifting rail wheel carrier with a hydraulic device shown in FIG. 2-3;

FIG. 3-1 illustrates a rail wheel disposed on a side of a steel ring of a tire according to one embodiment of the invention;

FIG. 4-1 illustrates a rail wheel with a shaft disk disposed on a side of a steel ring of a tire according to one embodiment of the invention;

FIG. 5 illustrates a road and rail vehicle traveling on a road according to one embodiment of the invention;

FIG. 5-1 is a side view of the road and rail vehicle shown in FIG. 5;

FIG. 6-1 illustrates an application of the guide road shown in FIG. 6;

FIG. 7-1 illustrates an application of the routing device shown in FIG. 7;

FIG. 8 illustrates a rail wheel disposed in a fixed rail wheel carrier on a road according to one embodiment of the invention;

FIG. 8-1 illustrates a rail wheel disposed in a lifting rail wheel carrier on a road according to one embodiment of the invention;

FIG. 9-1 illustrate a fold device in operation according to one embodiment of the invention;

FIGS. 10 and 10-1 illustrate a rail wheel lifting on a railway track via a fold device according to one embodiment of the invention;

FIGS. 11 and 11-1 illustrate a rail wheel without a flange lifting on a railway track via a fold device according to one embodiment of the invention;

FIG. 12 illustrates an application of a turnout according to one embodiment of the invention;

FIG. 13-1 is a bottom view of a mobile station according to one embodiment of the invention;

FIG. 14-1 is a top view of the routing device shown in FIG. 14;

FIG. 15-1 is a top view of the routing device shown in FIG. 15;

DETAILED DESCRIPTION OF THE EMBODIMENTS

Example 1

Figure 1:
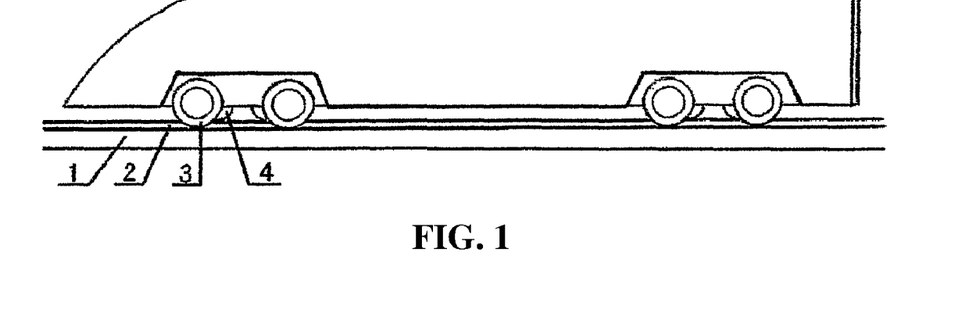
FIG. 1 is a schematic view of a road and rail vehicle according to one embodiment of the invention.

As shown in FIG. 1, a road and rail vehicle of the invention comprises a plurality of tires 3 and rail wheels 4. The rail wheels 4 travel on a railway track 2, and the tires 3 travel on a road 1 disposed on both sides of the railway track 2.

Figure 11:
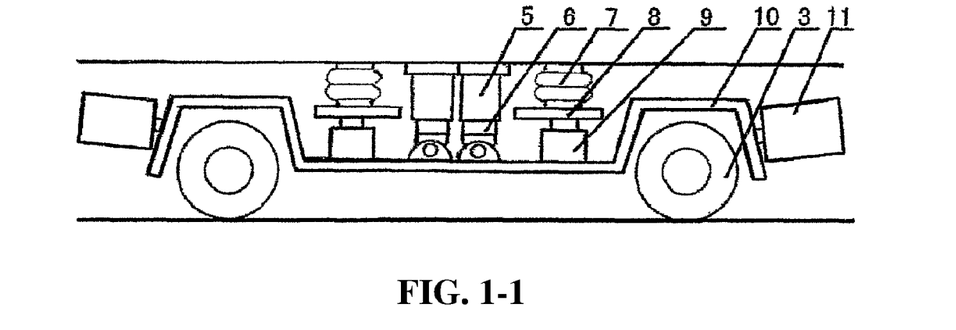

As shown in FIG. 1-1, a pair of tire carriers 10 is disposed below the road and rail vehicle via a slide shaft 6 and a slide sleeve 5. A damping spring 7 and a hydraulic cylinder 9 are disposed between a lower portion of the vehicle and the tire carrier 10. The rail wheel 4 is driven by a motor 11. In application, as pressure of the hydraulic cylinder 9 is increased, the hydraulic cylinder 9 abuts against the vehicle via a supporting plate 8 thereabove and the damping spring 7, weight of the vehicle supported by the tire 3 increases, pressure between the rail wheel 4 and the railway track 2 decreases, and driven friction between the tire 3 and the road 1 increases. As pressure of the hydraulic cylinder 9 is decreased, pressure applied to the vehicle by the hydraulic cylinder 9, weight of the vehicle supported by the tire 3 and resistance during operation of the vehicle decreases.

In application, the tire carrier 10 can be installed below the vehicle via a shaft and a shaft sleeve. The shaft is received in the shaft sleeve, and capable of moving horizontally and vertically therein, so as to force the tire carrier 10 to move along. The tire carrier 10 is connected to the rail wheel carrier 12 via a steering linkage. As the rail wheel carrier 12 rotates, it forces the tire carrier 10 to rotate synchronously.

Figure 2:
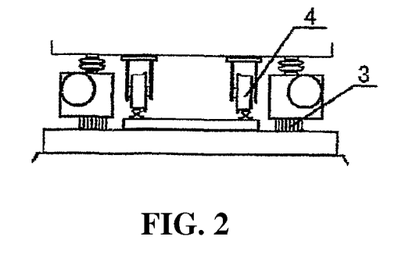
FIG. 2 illustrates a tire and a rail wheel disposed below a road and rail vehicle according to one embodiment of the invention.
Figure 21:
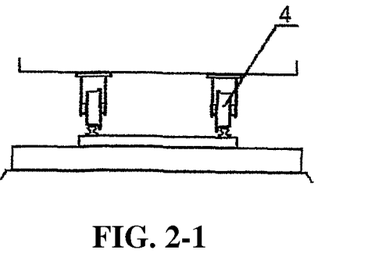
Figure 22:
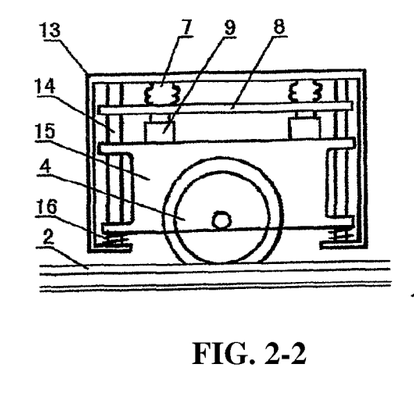

Referring to FIGS. 2 and 2-1, the rail wheels 4 can be disposed in a fixed rail wheel carrier 13. As shown in FIG. 2-2, the rail wheels 4 are disposed in a sliding framework 15. The sliding framework 15 is disposed on a guide bar 14 in the fixed rail wheel carrier 13. A supporting plate 8 installed on the guide bar 14 via a slide sleeve is disposed above the sliding framework 15, and a hydraulic cylinder 9 is disposed between the supporting plate 8 and the sliding framework 15. A damping spring 7 is disposed between the supporting plate 8 and the fixed rail wheel carrier 13, and a reset spring 16 is disposed below the sliding framework 15 and the guide bar 14. As the vehicle starts and speeds up, pressure of the hydraulic cylinder 9, pressure between the rail wheels 4 and the railway track 2 and weight supported by the rail wheels 4 decreases, and most weight of the vehicle is supported by the tires 3, thus driven friction between the tire 3 and the road 1 increases, and the vehicle is capable of starting and speeding instantly. As the vehicle brakes, the hydraulic cylinder 9 reduces pressure on and weight supported by the rail wheels, and thus braking friction of the tires 3 increases, and the vehicle is capable of braking instantly.

In application, a pressure adjusting device can be installed on the tire carrier 10 or/and the rail wheel carrier 12, so as to adjust pressure between the rail wheel 4 and the railway track 2 or the tire 3 and the road 1 and vehicle weight supported by the rail wheel 4 or the tire 3 according to an operation state of the vehicle. As the vehicle passes a bend, pressure of rail wheels on the outer side of the bend and that of the pressure adjusting device on the tire carrier are simultaneously increased, or pressure of rail wheels on the inner side of the bend and that of the pressure adjusting device on the tire carrier are simultaneously decreased, so that an external height of the vehicle increases, an internal height thereof decreases, and centrifugal force generated when passing the bend is eliminated.

Figure 23:
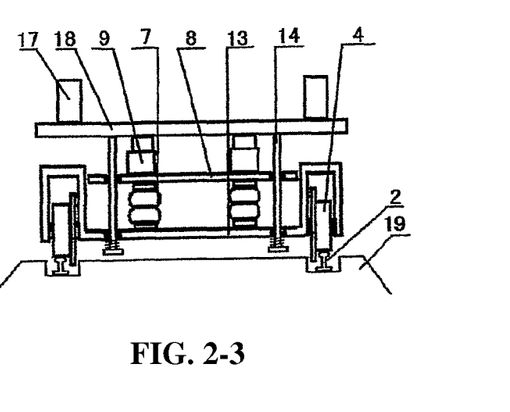
Figure 24:
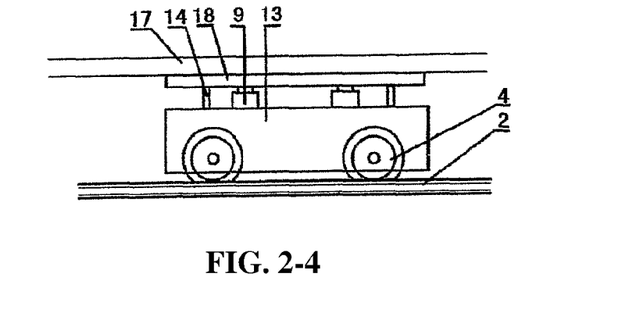

Referring to FIG. 2-3, the rail wheels 4 are disposed on a mounting panel 18 below a vehicle frame 17 via the fixed rail wheel carrier 13. A fixed rail wheel carrier 13 is connected to the mounting panel 18 via a guide bar 14. A supporting plate 8 is disposed between the fixed rail wheel carrier 13 and the mounting panel 18. A hydraulic cylinder 9 on the supporting plate 8 abuts against the mounting panel 18. A damping spring 7 is disposed between the supporting plate 8 and the mounting panel 18, and a reset spring 16 is disposed between one end of the guide bar 14 and the fixed rail wheel carrier 13.

As shown in FIGS. 2-3 and 8-1, a pair of slopes is disposed on both sides of a slab track of the railway track 2. As a vehicle of the invention needs to enter or exit the track, pressure on the hydraulic cylinder 9 on the rail wheel 4 is eliminated, and the reset spring 16 below the guide bar 14 applies pressure on the fixed rail wheel carrier 13 or the sliding framework 15 (as shown in FIG. 2-2), so that the rail wheel 4 in the fixed rail wheel carrier 13 is higher than the railway track, the tire 3 travels on the road 1 via the slope 19, and the vehicle enters or exits the road. In application, the railway track 2 is disposed above the slab track, or a rail surface of a track groove inside the slab track is aligned with a surface of the slab track.

Figure 3:
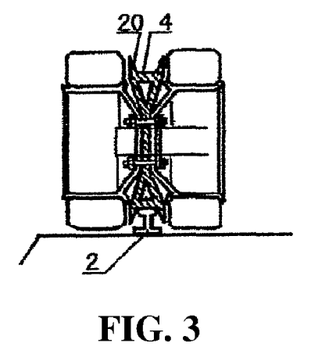
FIG. 3 illustrates a rail wheel disposed between tires according to one embodiment of the invention.

Referring to FIG. 3, the rail wheel 4 is disposed on a rotating shaft between the tires 3, and a pair of guide flanges 20 is disposed on both sides of the rail wheel 4.

Figure 31:
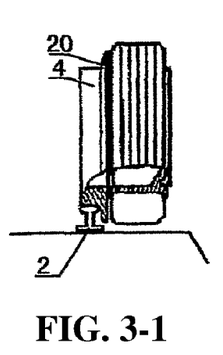

As shown in FIG. 3-1, the rail wheel 4 is disposed on a steel ring on the side of the tire 3, and a guide flange 20 is disposed on the side of the rail wheel 4. As the rail wheel travels on the railway track 2, the tire 3 detaches from the road, and the vehicle travels on the railway track 2 via the rail wheel 4. Since rolling resistance of the rail wheel 4 is far less than that of the tire 3, driving power and fuel consumption of the vehicle are reduced by more than 70%.

Figure 4:
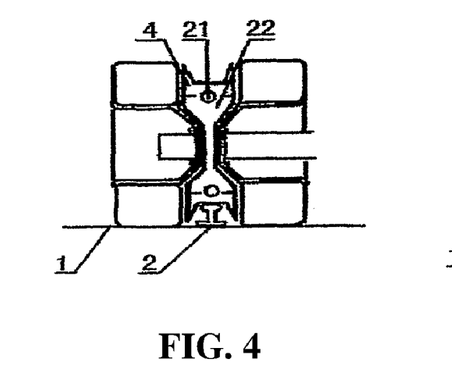
FIG. 4 illustrates a rail wheel with a shaft disk disposed between tires according to one embodiment of the invention.
Figure 41:
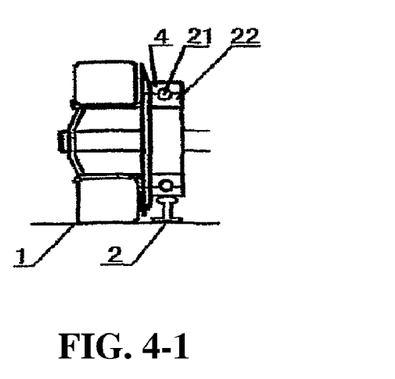

As shown in FIGS. 4 and 4-1, the rail wheel 4 is disposed on a rail wheel center 22 via a shaft disk 21. The rail wheel center 22 is disposed on a rotating shaft between two tires 3, or on the side of the steel ring of the tire. Vehicle weight is supported by the tire 3 and the rail wheel 4, and is guided by the rail wheel 4 and driven by the tire 3.

Example 2

Figures 5, 51:
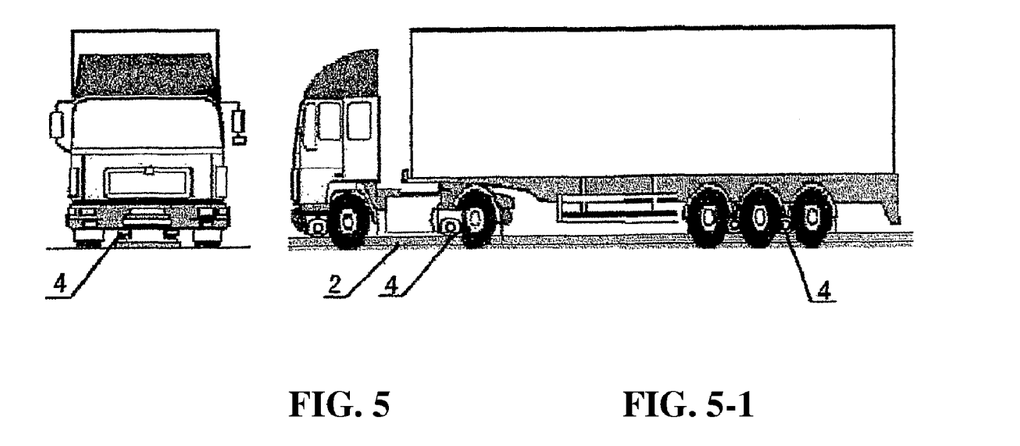

As shown in FIGS. 5 and 5-1, a road and rail vehicle of the invention comprises a plurality of tires 3 and rail wheels 4. The rail wheels 4 travel on a railway track 2, and the tires 3 travel on a road 1 disposed on both sides of the railway track 2.

Figure 6:
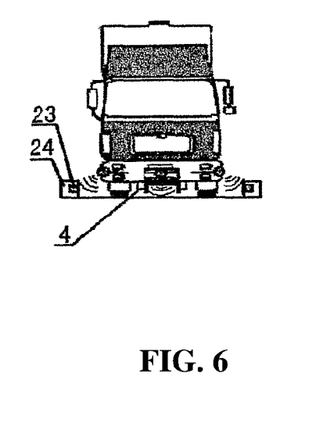
FIG. 6 is a schematic view of a guide road in front of a railway track according to one embodiment of the invention.
Figure 61:
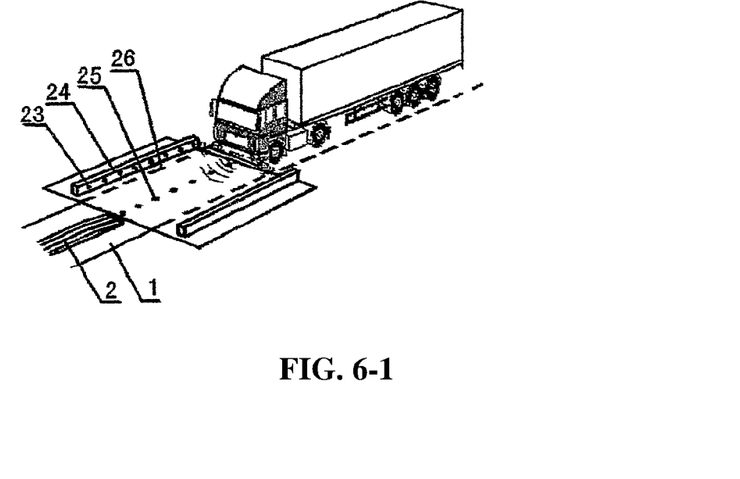
Figure 71:
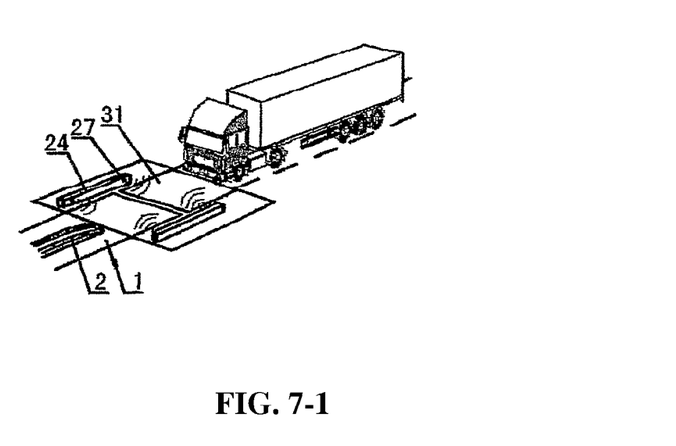
Figure 91:
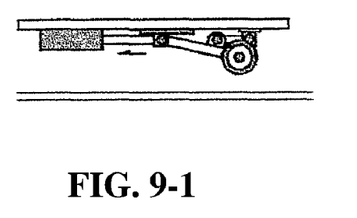
Figure 101:
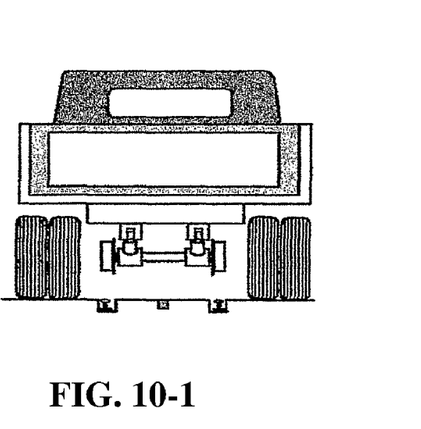
Figure 111:
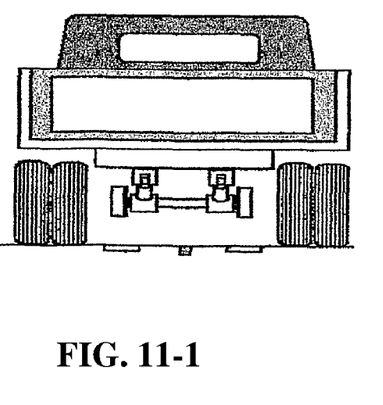

As shown in FIGS. 6 and 6-1, a guide road is in front of the track, and a pair of guide walls 24 is disposed on both sides of the guide road. A signaling device 23 is disposed on the guide wall 24. A guide line 26 and a guide marker 25 are disposed on the road 1. The vehicle is guided to the track via the guide wall 24. A range sensor or a signal receiver installed on the vehicle measures a distance between the vehicle and the guide wall 24 or the signaling device 23, so as to determine a transverse position of the vehicle on the road 1. Alternatively, an electromagnetic sensor installed on the vehicle measures magnetic signals generated by the guide marker 25, or a camera checks the guide line 26, so as to determine a transverse position of the vehicle on the road 1. A steering control device installed on the steering device controls the steering rail wheel to turn, so as to adjust an angle and a position of the vehicle, and to ensure the vehicle travels on a central line of the track, the rail wheel 4 is aligned with and travels on the railway track 2, and the tire 3 is aligned with and travels on the road 1.

Example 3

A routing device is disposed at the front end of the railway track 2.

Figure 7:
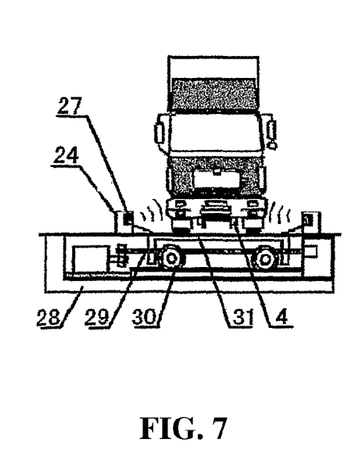
FIG. 7 is a schematic view of a routing device in front of a railway track according to one embodiment of the invention.
Figures 8, 81:
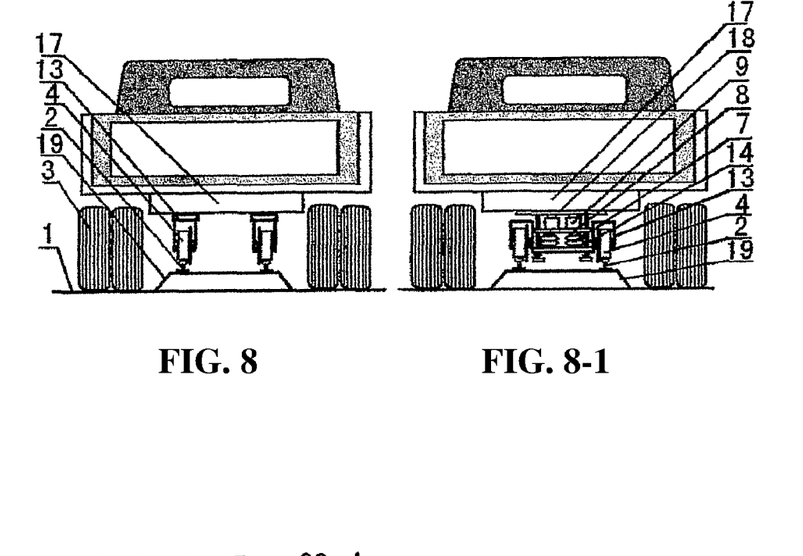

Referring to FIG. 7, the routing device comprises a base 28 and at least one supporting plate 31. The supporting plate 31 is aligned with the road and capable of moving horizontally and adjusting a direction or an angle of the vehicle entering the railway track 2. A rolling rail wheel 30 is disposed below the supporting plate 31, and a pair of reset springs is disposed on both ends of the supporting plate 31. A transition portion elevating gradually is disposed on a rail surface of a front end of the railway track 2, and the rail surface is in a shape of a cusp.

As the vehicle is contacted with the routing device and the tire 3 travels on the supporting plate 31, a range sensor or a signal receiver 27 disposed in guide walls 24 at both sides of the supporting plate 31 measures an angle or a position of the vehicle, and controls a hydraulic device or an electric device disposed on both sides of the supporting plate 31 according to the angle or the position. In detail, the range sensor or the signal receiver 27 switches on the hydraulic device, the hydraulic device pumped high-pressure oil into a hydraulic cylinder, and a piston on the hydraulic cylinder drives the supporting plate 31 to operate. Alternatively, a motor in the electric device forces the supporting plate 31 to operate via a screw 29. Then the supporting plate 31 forces the vehicle to move horizontally and to be aligned with a central line of the road, and enables the rail wheel 4 to be aligned with the railway track. After that, the hydraulic device stop working, the rail wheel 4 travels on the railway track 2 and the tire 3 leaves the supporting plate 31, the supporting plate 31 returns to an original position under the action of the reset spring or the screw.

In application, a guide strake or a signal generator communicating with the range sensor or the signal receiver 27 are disposed on both sides of the routing device.

Example 4

Figure 9:
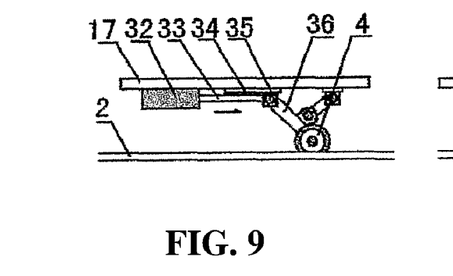
FIG. 9 illustrates a fold device disposed on a rail wheel according to one embodiment of the invention 1.

As shown in FIG. 9, a fold device is disposed on a vehicle frame 17 or a bottom plate. A rail wheel 4 is disposed below a lifting arm 36. One end of the lifting arm 36 is disposed on a slider 35 in a sliding groove 34. The slider 35 is disposed on a front end of a push pull rod 33 in a hydraulic cylinder 32.

Figure 10:
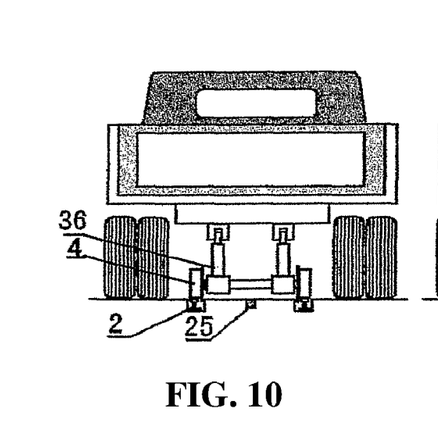

As the vehicle enters a guide road of the track, a vehicle sensor or a camera determines a position of the vehicle on the track according to a guide mark or a railway track, a control device in a steering device controls a steering rail wheel so that the vehicle is on a central line of the track and the rail wheel is aligned with the railway track (referring to FIG. 10). Then, the hydraulic cylinder 32 pushes the push pull rod 33 and the slider 35, and the slider 35 pushes the lifting arm 36 (referring to FIG. 9) so that the rail wheel 4 falls on the railway track 2 and the slider 35 is locked by the sliding groove 34 or an electromagnetic locking device on the slider 35. After that, the push pull rod 33 pushes the lifting arm 36 and pressure applied to the railway track by the rail wheel 4 is increased, so that the rail wheel 4 and the tire 3 load vehicle weight together, and thus running resistance and fuel consumption are reduced. As the vehicle leaves the track, the electromagnetic locking device on the slider 35 is enabled, the hydraulic cylinder 32 pulls the push pull rod 33 and the slider 35 (referring to FIGS. 9-1 and 10-1), the rail wheel 4 is lifted away from the road 1 and the railway track 2 via the lifting arm 36, and the vehicle weight is supported by the tire 3 only at this time.

Referring to FIG. 10, the rail surface of a railway track 2 in a track groove is aligned with a surface of the road 1.

Referring to FIG. 11, a planar railway track 38 having a rail surface aligned with the road surface is disposed in the track groove, and no guide flange is disposed below the rail wheel 37. As the vehicle enters the track, a vehicle sensor or a camera determines a horizontal position of the vehicle according to a guide line, a guide marker or a railway track on the road, and a control device in a steeling device controls a steeling rail wheel so that the vehicle travels on a central line of the track. Since a rail surface of the planar railway track 38 is wide enough, the rail wheel without a guide flange can easily falls on the railway track and loads part of the vehicle weight.

Since a rail surface of the railway track 2 is aligned with the road 1, other vehicles on the road 1 are not affected, and thus the railway track 2 can be disposed on an urban public transportation or a highway, and allows vehicles with no rail wheels to travel thereon.

A tire carrier can be disposed below the vehicle via the fold device, and makes it possible for the tire to lift.

Example 5

Figure 12:
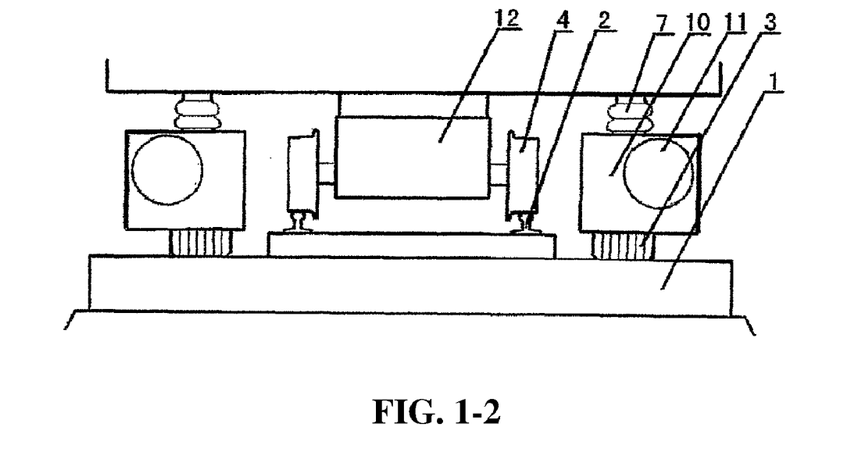

As shown in FIG. 12, a road is disposed on a ram in a sliding groove of a base 39 of a turnout, and a gap 43 allowing a tire to pass by is disposed between a straight rail and a turnout rail on the base and the ram 40 and at an interaction between a straight transition rail 41 and a turnout transition rail 42. The turnout horizontally moves the straight rail and the turnout rail above a sliding groove 45 of a base 39 via a pair of rams 40 in the sliding groove 45 of a base 39, so as to facilitate switch transaction. In application, the rams 40 are driven by a screw of an electric device or a hydraulic cylinder of a hydraulic device. Since the gap 43 is disposed between the straight rail and a turnout rail on the base and the ram 40, and between the straight transition rail 41 and the turnout transition rail 42, tires lower than a rail surface of the railway track can freely pass by. Meanwhile, a straight railway track 44 disposed at the front end of the turnout transition rail 42 makes it easy for rail wheels to pass by and reduces impact on a rail joint.

Figure 121:
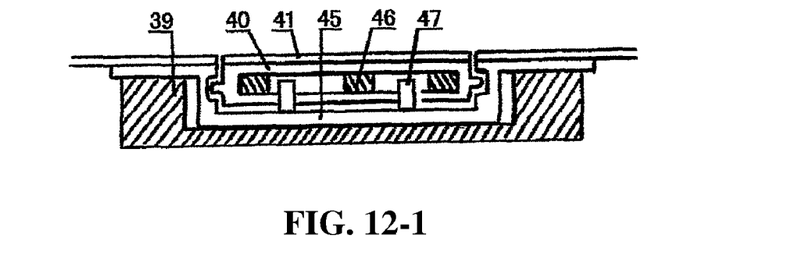
Figure 131:
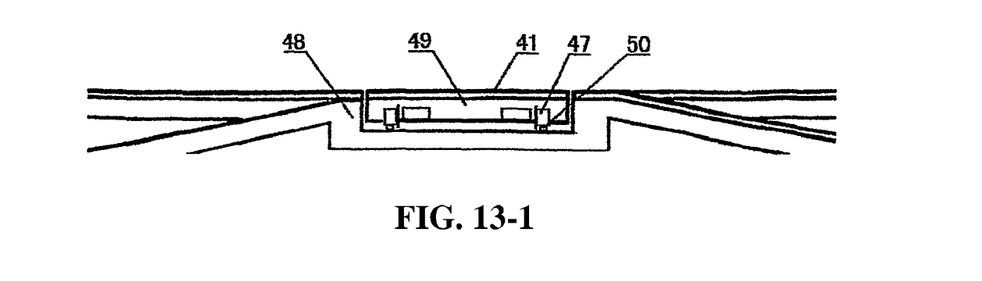
Figure 141:
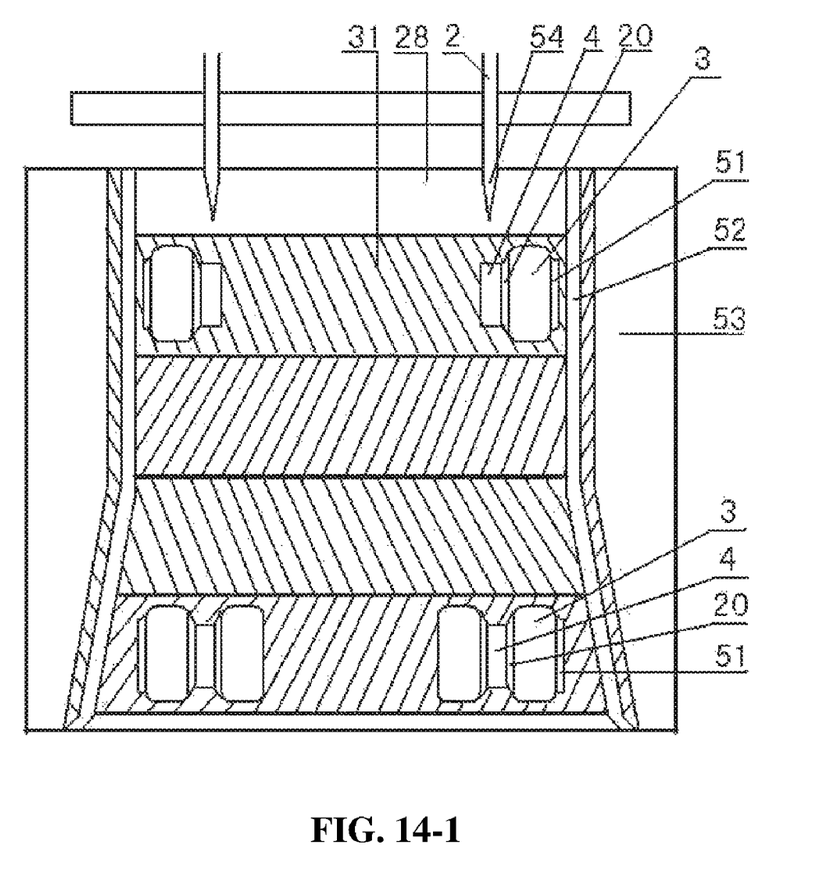
Figure 151:
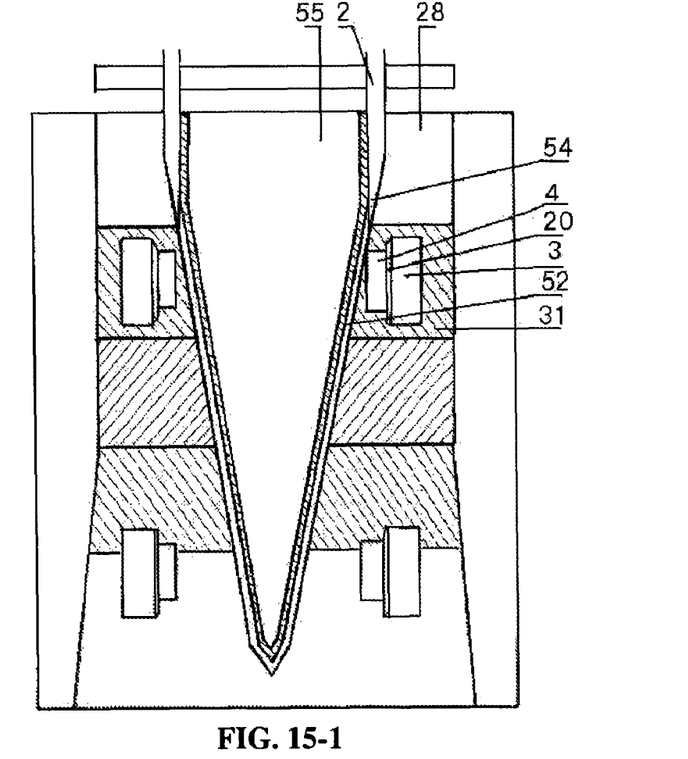

As shown in FIG. 12-1, the sliding groove 45 in the base 39 is made of metal, and a frame and a bottom plate of the ram 40 is also made of metal. Concrete sleepers 46 can be disposed in the frame or on the bottom plate of the ram 40, so as to support the transition rails. As climate changes, since the transition rails, the frame or the bottom plate of the ram 40, and the sliding groove 45 are all made of metal and have the same thermal expansion coefficient, the sliding gaps between the ram 40 and the sliding groove 45 and between the transition rail and the railway track are small, and therefore, blast shock and vibration generated are reduced, the railway track is more safe, and the lifetime of the turnout is enhanced. In application, a roller 47 is disposed below the ram 40, and a guide groove and a guide bar are disposed between the ram 40 and the sliding groove 45.

Figure 13:
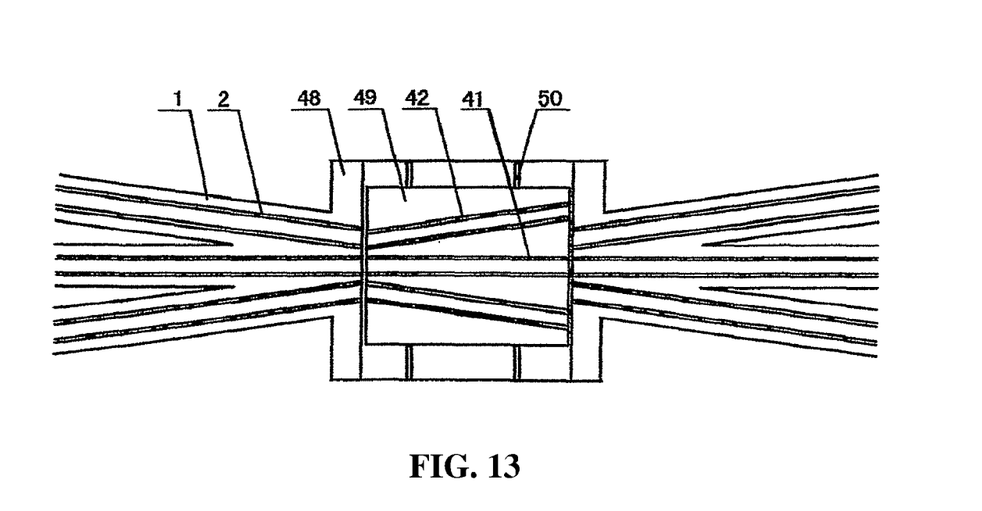
FIG. 13 is a schematic view of a turnout according to one embodiment of the invention.

As shown in FIG. 13, a ram 49 disposed on a mobile station performs switch transaction. The ram 49 is disposed in a sliding groove of the base 48. A straight rail and a turnout rail are disposed above the sliding groove. The transition rail 41, the turnout transition rail 42 and a road are disposed above the ram 49. A gap 43 allowing a tire to pass by is disposed between the straight rail and the turnout rail and at an interaction between a straight transition rail 41 and a turnout transition rail 42. The rams 49 is driven by a screw of an electric device or a hydraulic cylinder of a hydraulic device, and operates on a guide rail 50 in the sliding groove via a rail wheel 47.

Example 6

Figure 14:
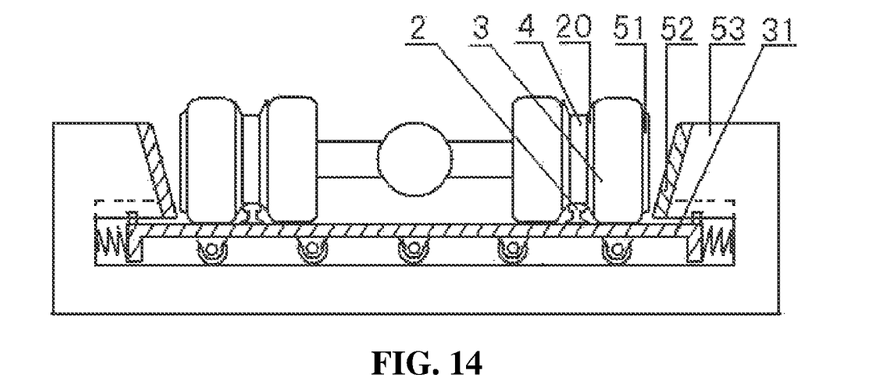
FIG. 14 is a schematic view of a routing device with a side beam according to one embodiment of the invention.

As shown in FIG. 14, a routing device comprises a base 27, a pair of side beams 53 disposed on both sides of the base 27, and a plurality of supporting plates 31 capable of moving horizontally in the base 27. A roller is disposed below the supporting plate 31, and a pair of reset springs are disposed on both ends of the supporting plate 31. A guide plate 52 bending outwards is disposed on the side beam 53. A rail wheel 4 having a flange 20 on one side is disposed on an inner steel ring of a front tire (steering tire) 3 of the vehicle. A guide flange 51 is disposed on an outer side of the steel ring. Another rail wheel 4 having a pair of flanges 20 on both sides is disposed between rear tires (driving tire) 3 of the vehicle. Another guide flange 51 is disposed on an outer side of an outer one of the rear tires 3. A front end 54 of the railway track 2 is in a shape of a wedge, and has a transition portion elevating gradually. The front end 54 is also disposed on the base 28.

In application, as the vehicle of the invention travels on the routing device and the rail wheel 4 is located on the supporting plate 31, if the direction or angle of the vehicle entering the railway track is inaccurate, the guide flange 51 on the outer side of an outer one of the rear tires 3 is contacted with the guide plate 52 on the side beam 53, and a reacting force is horizontally applied to the rail wheel 4. Under the reacting force, the supporting plate 31 below the rail wheel 4 moves in an opposite position, so as to adjust the direction and the angle of the vehicle entering the railway track, and to enable the rail wheel 4 to be aligned with the railway track 2 and the vehicle to travel thereon. As the vehicle travels on the railway track 2 and the rail wheel 4 detaches from the supporting plate 31, the supporting plate 31 resets under the action of the reset springs.

Example 7

Figure 15:
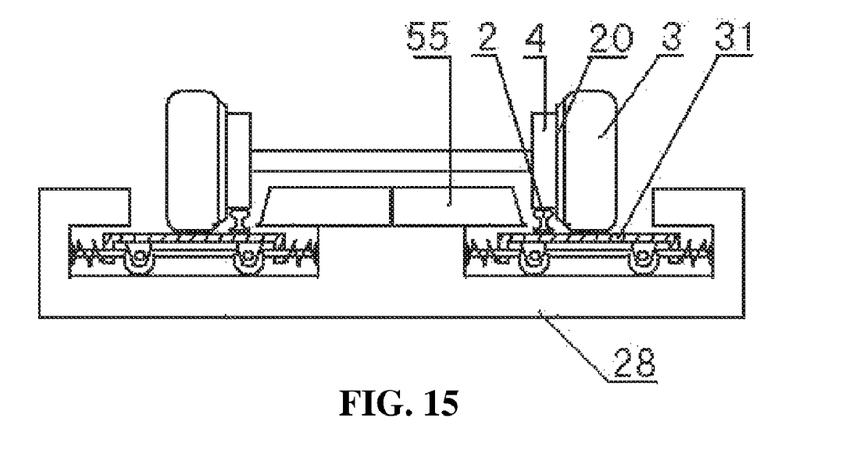
FIG. 15 is a schematic view of a routing device with a guide station according to one embodiment of the invention.

As shown in FIG. 15, a guide station 55 is disposed above a base 28 of the routing device. A pair of guide plates 52 bending outwards is disposed on both sides of the guide station 55. The guide station 55 is in a shape of a wedge or a cusp. A supporting plate 31 capable of moving horizontally is disposed on the base 28. A roller is disposed below the supporting plate 31, and a pair of reset springs is disposed on both ends of the supporting plate 31. A rail wheel 4 having a flange 20 is disposed on an inner steel ring of the rail wheel 4. A front end 54 of the railway track 2 is in a shape of a wedge, and has a transition portion elevating gradually. The front end 54 is also disposed on the base 28.

In application, as the vehicle of the invention travels on the routing device and the rail wheel 4 is located on the supporting plate 31, if a direction or an angle of the vehicle entering the railway track is inaccurate, the rail wheel 4 is contacted with the guide plate 52, and a reacting force is horizontally applied to the rail wheel 4. Under the reacting force, the supporting plate 31 below the rail wheel 4 moves in an opposite position, so as to adjust the direction and the angle of the vehicle entering the railway track, and to enable the rail wheel 4 to be aligned with the railway track 2 and the vehicle to travel thereon. As the vehicle travels on the railway track 2 and the rail wheel 4 detaches from the supporting plate 31, the supporting plate 31 resets under the action of the reset springs.

Example 8

Figure 16:
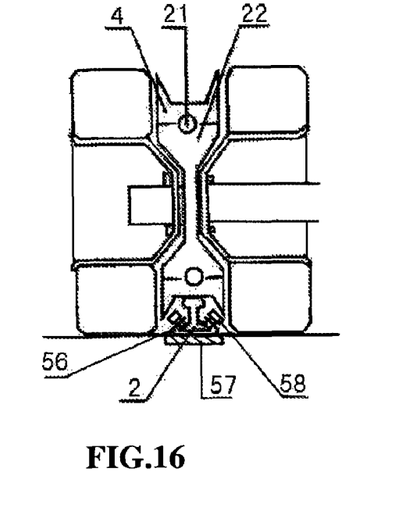
FIG. 16 illustrates a railway track fixed in a groove on a metal plate according to one embodiment of the invention.

As shown in FIG. 16, a railway track 2 is received in a groove 56 on a metal plate 57 in a road 1, and can be adjusted via a screw 58 on the groove 56.

Example 9

Figure 17:
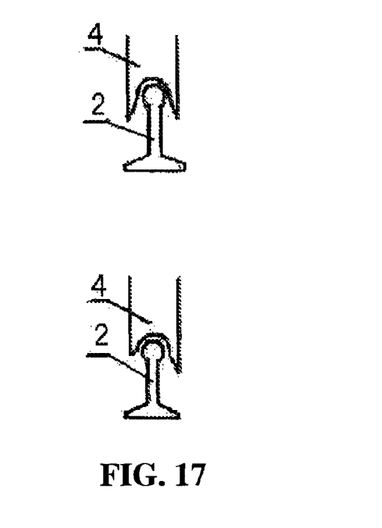
FIG. 17 illustrates an arc-shaped rail wheel tread and an arc-shaped track tread according to one embodiment of the invention.

As shown in FIG. 17, the tread of the rail wheel 4 and the rail surface of the railway track 2 are arc-shaped, so as to make it convenient for the vehicle to turn and travel, to control motion of the vehicle, and to improve safety.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A track for a tandem road and rail vehicle, comprising a railway track;

a routing device having a supporting plate;

a turnout;

a pair of distance-measuring devices disposed on both sides of said supporting plate; and a pair of electronic devices or hydraulic devices disposed on both sides of said supporting plate; wherein said routing device is disposed in front of said railway track and connected to a road;

said supporting plate is aligned with the road and capable of moving horizontally and adjusting a direction or an angle of the road and a rail vehicle entering said railway track;

said turnout enables the road and rail vehicle to switch between the road and said railway track; and said supporting plate functions to measure a position of the road and rail vehicle with respect to said supporting plate and to control said electronic device or said hydraulic device to horizontally move said supporting plate, so as to align the road and rail vehicle with said railway track.

2. The track for a road and rail vehicle of claim 1, wherein a guide station is disposed in said routing device;

a pair of guide plates or guide bars are disposed on both sides of said guide station;

said guide plates bend inwards;

said guide bar is semicircular; and a pressure sensor is disposed between said guide plate and said guide station for controlling said electronic device or said hydraulic device to horizontally move said supporting plate.

3. The track of a road and rail vehicle of claim 1, wherein a pair of side beams are disposed on both sides of said routing device;

a guide plate or a guide bar is disposed on an inner side of said side beam;

said guide plate bends outwards;

said guide bar is semicircular; and a pressure sensor is disposed between said guide plate and said side beam for controlling said electronic device or said hydraulic device to horizontally move said supporting plate.

* * * * *